United States Patent
Dutton et al.

(10) Patent No.: US 11,822,017 B2
(45) Date of Patent: *Nov. 21, 2023

(54) ROUTING FOR DTOF SENSORS

(71) Applicant: STMicroelectronics (Research & Development) Limited, Marlow (GB)

(72) Inventors: Neale Dutton, Edinburgh (GB); John Kevin Moore, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,261

(22) Filed: Jul. 19, 2022

(65) Prior Publication Data

US 2022/0357435 A1    Nov. 10, 2022

Related U.S. Application Data

(63) Continuation of application No. 16/895,477, filed on Jun. 8, 2020, now Pat. No. 11,428,792.

(51) Int. Cl.
*G06V 20/64* (2022.01)
*G01S 7/4863* (2020.01)
*G01S 17/89* (2020.01)

(52) U.S. Cl.
CPC ............ *G01S 7/4863* (2013.01); *G01S 17/89* (2013.01)

(58) Field of Classification Search
CPC ........... G01C 3/00; G06F 3/042; G06F 13/16; G06V 20/64; H04N 25/77; H04N 25/705; G02B 6/122

See application file for complete search history.

(56) References Cited

U.S. PATENT DOCUMENTS

| | | | |
|---|---|---|---|
| 6,466,265 | B1 | 10/2002 | Lee et al. |
| 7,465,934 | B2 | 12/2008 | Xu |
| 10,983,197 | B1 | 4/2021 | Zhu et al. |
| 2017/0134710 | A1 | 5/2017 | Wang et al. |
| 2017/0195587 | A1 | 7/2017 | Kirsch |
| 2018/0209846 | A1 | 7/2018 | Mandai et al. |
| 2019/0018117 | A1 | 1/2019 | Perenzoni et al. |

OTHER PUBLICATIONS

Palubiak, Darek et al., "Pandion: A 400 X 100 SPAD sensor for ToF LiDAR with 5 Hz median DCR and 11 ns mean dead-time", Image Sensors, www.imagesensors.org, Jun. 23, 2019, 4 pages.

*Primary Examiner* — Tu X Nguyen
(74) *Attorney, Agent, or Firm* — Slater Matsil, LLP (57) ABSTRACT

A ToF sensor includes an array of pixels having first and second subsets of pixels, first and second pluralities of TDCs, a routing bus having first and second pluralities of bus drivers, and a controller configured to: when the first subset of pixels is active and the second subset of pixels is not active, control the first plurality of bus drivers to route events from half of the pixels of the first subset to the first plurality of TDCs and control the first and second pluralities of bus drivers to route events from the other half of the pixels of the first subset to the second plurality of TDCs, and when the first subset of pixels is not active and the second subset of pixels is active, control the first plurality of bus drivers to route events from the second subset of pixels to the first plurality of TDCs.

22 Claims, 8 Drawing Sheets top view

PRIOR ART

FIG. 1

PRIOR ART

FIG. 4C top view

FIG. 6B top view

ROUTING FOR DTOF SENSORS

CROSS-REFERENCE TO RELATED APPLICATIONS

This application is a continuation of U.S. patent application Ser. No. 16/895,477, entitled "Routing for DTOF Sensors," and filed on Jun. 8, 2020, which application is hereby incorporated herein by reference.

TECHNICAL FIELD

The present disclosure relates generally to an electronic system and method, and, in particular embodiments, to a routing for direct time-of-flight (DTOF) sensors.

BACKGROUND

Figure 1:
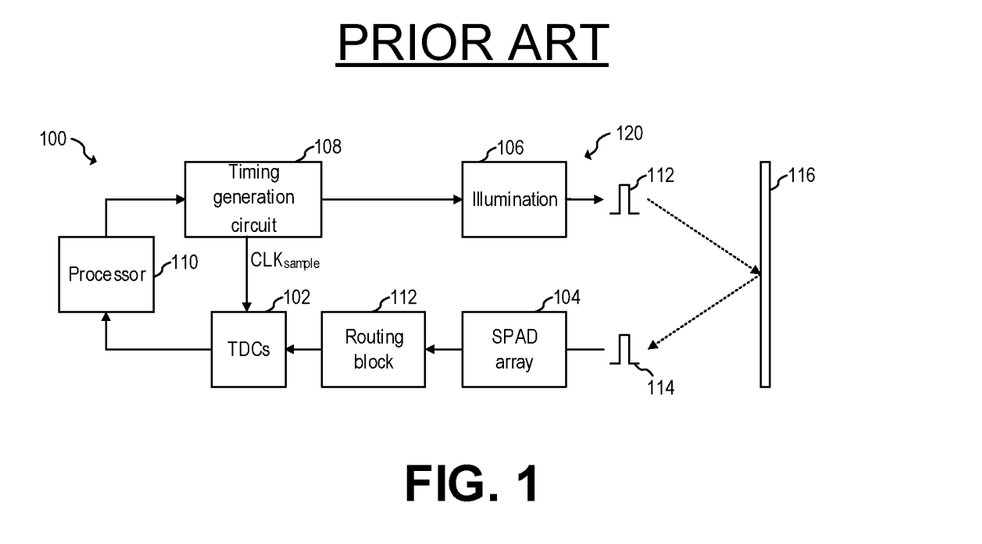
FIG. 1 shows a schematic diagram of a DTOF system.

DTOF image sensors use time-of-flight (ToF) techniques to determine distance towards a target to provide, e.g., 3D-depth maps. FIG. 1 shows a schematic diagram of DTOF system 100. DTOF system 100 includes illumination source 106, single photon avalanche diode (SPAD) array 104, time to digital converters (TDCs) 102, and processor 110. Routing block 112 couple SPAD array 104 to TDCs 102 (e.g., via metal traces and logic circuits). SPAD array 104, routing block 112 and TDCs 102 are generally implemented in the same integrated circuit (IC).

A DTOF sensor generally includes an image capture mechanism, data converter(s), frequency and timing generation circuits, and at least a portion of digital signal processing and data compression/storage. Therefore, in some cases, TDCs 102, SPAD array 104, timing generator circuit 108, and routing block 112 are jointly referred to as a DTOF sensor. In some cases, the DTOF sensor also includes processor 110 (or a portion of processor 110).

During normal operation, illumination source 106 emits light pulses 112 towards object 116, e.g., at times controlled by timing generator circuit 108. Reflected light pulses 114 are sensed by SPAD array 104 and routed to TDCs 102 (which are outside SPAD array 104). TDCs 102 generate digital representations of the time between the emissions of light pulses 112 and receptions of reflected light pulses 114. Processor 110 then determines the distance to object 116, e.g., by generating ToF histograms in a known manner based on the outputs of TDCs 102.

Figure 2:
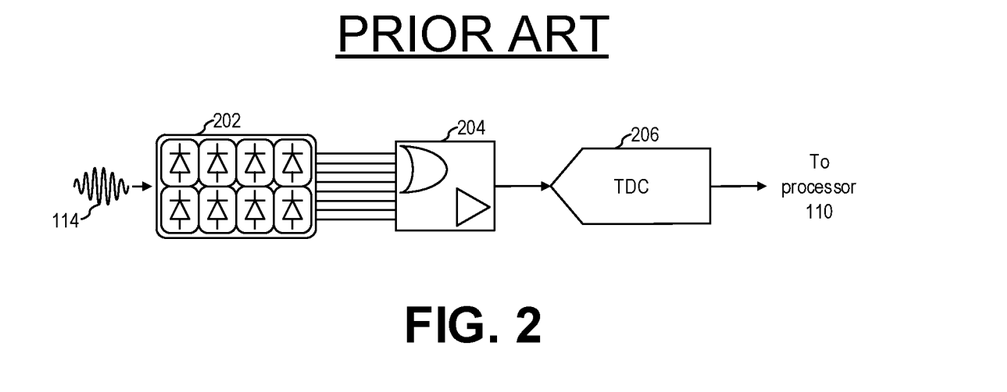
FIG. 2 shows a schematic diagram of a conventional DTOF signal chain.

SPAD array 104 may be formed by a plurality of pixels arranged in rows and columns, where each pixel includes one or more SPADs. For each pixel, a conventional DTOF signal chain is shown in FIG. 2. As shown in FIG. 2, SPADs 202 (of SPAD array 104) are coupled to TDC 206 (of TDCs 102) via routing block 204 (where routing block 204 may optionally include an OR tree). Even though SPADs 202 includes 8 SPADs, a different number of SPADs, such as 1, 2, 4, 10, 16, or other may also be used.

SUMMARY

In accordance with an embodiment, a time-of-flight (ToF) sensor includes: an array of pixels arranged in rows and columns, the array of pixels including first and second subsets of pixels, each pixel of the array of pixels configured to generate event signals; a first plurality of time to digital converters (TDCs); a second plurality of TDCs; a first routing bus coupled to the first and second pluralities of TDCs and to the first and second subsets of pixels, the first routing bus including a first plurality of bus drivers associated with the first subset of pixels and a second plurality of bus drivers associated with the second subset of pixels, the first plurality of bus drivers coupled to the second plurality of TDCs via the second plurality of bus drivers, and the second plurality of bus drivers coupled to the first plurality of TDCs via the first plurality of bus drivers; and a controller configured to: when the first subset of pixels is active and the second subset of pixels is not active, control the first plurality of bus drivers to route event signals from half of the pixels of the first subset of pixels to the first plurality of TDCs and control the first and second plurality of bus drivers to route event signals from the other half of the pixels of the first subset of pixels to the second plurality of TDCs, and when the first subset of pixels is not active and the second subset of pixels is active, control the first plurality of bus drivers to route event signals from the second subset of pixels to the first plurality of TDCs.

In accordance with an embodiment, a method includes: activating a first subset of pixels of an array of pixels of a time-of-flight (ToF) sensor, the array of pixels being arranged in rows and columns; when the first subset of pixels is active, controlling a first plurality of bus drivers of a first routing bus to route event signals from half of the pixels of the first subset of pixels to a first plurality of TDCs and controlling the first plurality of bus drivers and a second plurality of bus drivers to route event signals from the other half of the pixels of the first subset of pixels to a second plurality of TDCs, where the first plurality of bus drivers is coupled to the second plurality of TDCs via the second plurality of bus drivers, where the second plurality of bus drivers is coupled to the first plurality of TDCs via the first plurality of bus drivers, where the first plurality of bus drivers is associated with the first subset of pixels, and where the second plurality of bus drivers associated with a second subset of pixels of the array of pixels; activating the second subset of pixels; and when the second subset of pixels is active, controlling the first plurality of bus drivers to route event signals from the second subset of pixels to the first plurality of TDCs.

In accordance with an embodiment, an integrated circuit (IC) includes: an array of pixels arranged in rows and columns, the array of pixels including a first subset of pixels, each pixel of the array of pixels configured to generate event signals; a top plurality of time to digital converters (TDCs) physically disposed at the top of the array of pixels; a bottom plurality of TDCs physically disposed at the bottom of the array of pixels; a routing bus coupled to the top and bottom pluralities of TDCs and to the first subset of pixels, the routing bus including a plurality of bus drivers associated with the first subset of pixels; and a controller configured to: when the first subset of pixels is active, control the plurality of bus drivers to route event signals from a top half of the pixels of the first subset of pixels to the top plurality of TDCs and to route event signals from a bottom half of the pixels of the first subset of pixels to the bottom plurality of TDCs, and when the first subset of pixels is not active, control all of the plurality of bus drivers to route event signals of the routing bus to the top plurality of TDCs.

In accordance with an embodiment, a time-of-flight (ToF) sensor includes: an array of pixels arranged in rows and columns, each pixel of the array of pixels configured to generate event signals, the array of pixels including a subset of pixels; a routing bus coupled to the subset of pixels; a plurality of time-capture circuits coupled to the routing bus; and a controller configured to: when the subset of pixels is in integration mode, route event signals from a first pixel of the subset of pixels to a first time-capture circuit of the plurality of time-capture circuits via a first routing line of the routing bus, and when the subset of pixels is in readout mode, route data from the first time-capture circuit to a reading circuit via the first routing line.

In accordance with an embodiment, a method includes: setting a subset of pixels of an array of pixels of a time-of-flight (ToF) sensor to integration mode, the array of pixels being arranged in rows and columns; when the subset of pixels is in integration mode, routing event signals from a first pixel of the subset of pixels to a first time-capture circuit of a plurality of time-capture circuits via a first routing line of a routing bus; setting the subset of pixels to readout mode; and when the subset of pixels is in readout mode, routing data from the first time-capture circuit to a reading circuit via the first routing line.

In accordance with an embodiment, an integrated circuit (IC) includes: an array of pixels arranged in rows and columns, each pixel of the array of pixels configured to generate event signals, the array of pixels including a subset of pixels; a routing bus coupled to the subset of pixels, the routing bus including J routing lines, where J is a positive integer greater than 1, where each routing line of the J routing lines is coupled to more than 1 pixels of the subset of pixels; a plurality of time-capture circuits coupled to the routing bus; and a controller configured to: when the subset of pixels is in integration mode, route event signals from a first pixel of the subset of pixels to a first time-capture circuit of the plurality of time-capture circuits via a first routing line of the routing bus, and when the subset of pixels is in readout mode, route data from the first time-capture circuit to a reading circuit via the first routing line.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, routing for (e.g., high density) DTOF image sensors. Embodiments of the present invention may be used in other types of sensors, such as other types of SPAD-based image sensors, as well as non-SPAD based sensors, such as a CMOS sensor (where, e.g., the SPAD is replaced by a CMOS sensor, and logic and tri-state buffering is replaced, e.g., by a source-follower-based readout circuit, for example).

DTOF image sensors are generally data-heavy, with many signals to be routed. For example, the routing between SPADs 202 and TDC 206 may include metal traces formed, e.g., in the metal layers of the IC that includes SPAD array 104 and TDCs 102. For example, each SPAD or group of SPADs 202 may be connected with a tri-stated buffer to a full height column line connected to TDC 206.

Some of the signals, such as signals between SPADs 202 and TDC 206, are sensitive to timing. For such signals, it may be desirable to maintain timing precision across the routing as well as over process, voltage, and temperature (PVT) variations. Some of the signals, such as the signals between TDC 206 and processor 110, carry high frequency data, thereby impacting power consumption. In a high resolution DTOF sensor (e.g., with hundreds or thousands of SPADs, or more), routing the DTOF sensor signals may be challenging.

Some embodiments advantageously reduce the number of routes and/or the length of the routes in a DTOF image sensor, e.g., to improve timing precision, and/or reduce power consumption, and/or reduce area, and/or achieve higher density of pixels, and/or achieve higher resolution, for example.

Figure 3:
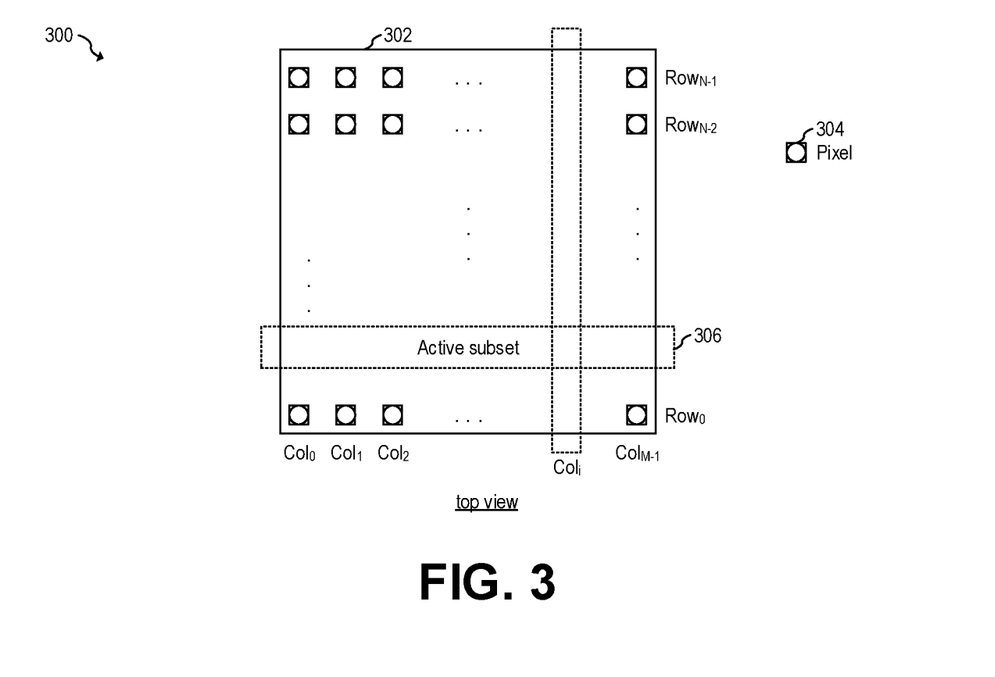
FIG. 3 shows a diagram illustrating a top view of a layout of a possible implementation of a pixel array of a DTOF image sensor (not to scale), according to an embodiment of the present invention.

FIG. 3 shows a diagram illustrating a top view of a layout of a possible implementation of pixel array 302 of DTOF image sensor 300 (not to scale), according to an embodiment of the present invention. Pixel array 302 includes M columns and N rows of pixels 304. Each pixel 304 includes 1 or more SPADs. Pixel array 302 includes a plurality of subset of pixels 304 (only 1 subset of pixels, active subset of pixels 306, is shown in FIG. 3 for clarity purposes).

During normal operation, different subsets of pixels are activated sequentially to sense light to allow for ToF determinations. For example, FIG. 3 shows active subset of pixels 306. Pixels 304 inside active subset of pixels 306 are active while pixels 304 outside active subset of pixels 306 are inactive. It is understood that active subset 306 represents the subset of pixels 304 that is currently active, and that the location of active subset 306 may dynamically change (e.g., sequentially in the vertical direction over each subset of pixels) during the integration process.

Pixels 304 inside active subset of pixels 306 (also referred to as active pixels) sense reflected light pulses 114. Corresponding TDC(s) (not shown in FIG. 3) sense events produced by the active pixels 304 when the active pixels 304 are excited by light. The TDC(s) then generate corresponding timestamps (based on the received events) that are then used to generate ToF histograms in a known manner. The process of sensing light by active pixels 304, and the generation of corresponding timestamps and ToF histograms may be referred to as an integration process.

Once the integration process is complete (e.g., over all subset of pixels of pixel array 302), data associated with pixels 304 (e.g., the corresponding timestamps or ToF histograms) are read (e.g., by processor 110) in a data readout process.

In some embodiments, M and N may be greater than 100, such as 120, 210, or 360 for example. Other values for M and N, such as higher than 360 or lower than 100 may also be used. In some embodiments M may be different than N.

In some embodiments, each subset of pixels of pixel array 302 (e.g., such as active subset of pixels 306) may have M columns and N/k rows, where k is a positive integer greater than or equal to 1. In some embodiments, each subset of pixels may have less than M columns, such as M/2, M/3, or a different number, for example.

As a non-limiting example, in an embodiment, N is equal to 360, M is equal to 120, and k is equal to 12. In such embodiment, each subset of pixels includes 30 pixels per column, and 120 columns of pixels 304.

During the integration process of such embodiment, events generated by active pixels 304 in each column $Col_i$ of active subset of pixels 306 (3600 active pixels divided into 120 columns in this example) may be processed by dedicated TDC(s) and histogram generation circuits (not shown). Once active pixels 304 inside subset of pixels 306 finish the integration process, such active pixels become inactive and the next subset of pixels (such as a subset of pixels immediately below subset of pixels 306) becomes active.

Once all subsets of pixels 304 of pixel array 302 have been (e.g., sequentially) activated during the integration process, data associated with each pixel 304 (e.g., the corresponding timestamps or ToF histograms) is read in the data readout process.

In some embodiments, array of pixels 302 is implemented in a single monolithic substrate inside an IC. In some embodiments, the single monolithic substrate may also include the TDCs, histogram generation circuits, and illumination source. In some embodiments, processor no, or portions of processor no may also be integrated inside the IC.

In an embodiment of the present invention, routing inside a DTOF sensor is reduced by disposing TDCs above and below a subset of SPADs. A split bus routes half of the SPADs of the subset of SPADs to corresponding top TDCs and the other half of the SPADs to corresponding bottom TDCs. In some embodiments, the split bus advantageously allows for twice more SPADs to be routed when compared to implementations that route each column of SPADs to TDCs in a single location (e.g., all TDCs above the subset of SPADs or all TDCs below the subset of SPADs).

Figure 4A:
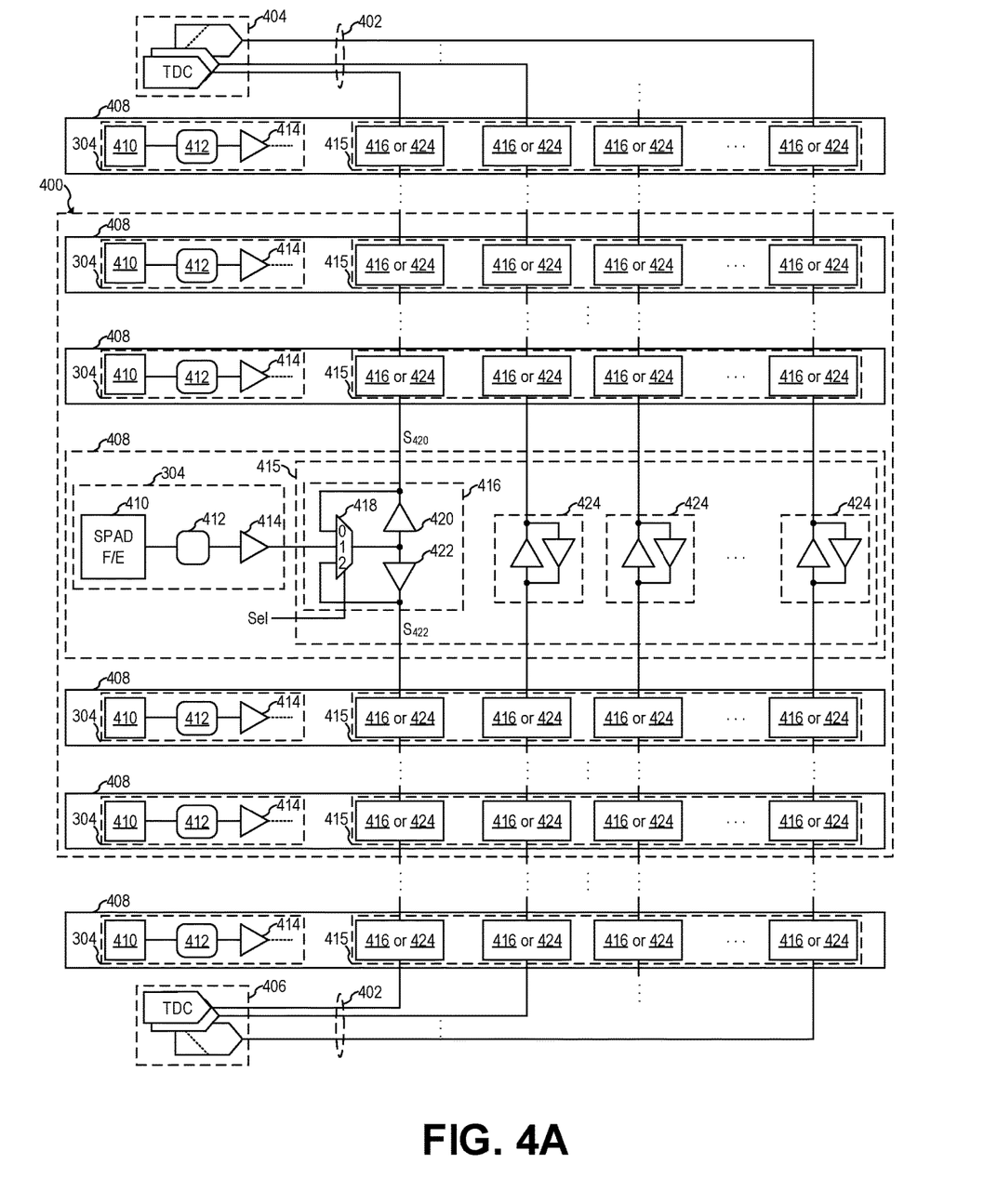
FIGS. 4A-4C show different levels of detail of a possible implementation of a subset of pixels of the pixel array of FIG. 3, according to an embodiment of the present invention.
Figure 4B:
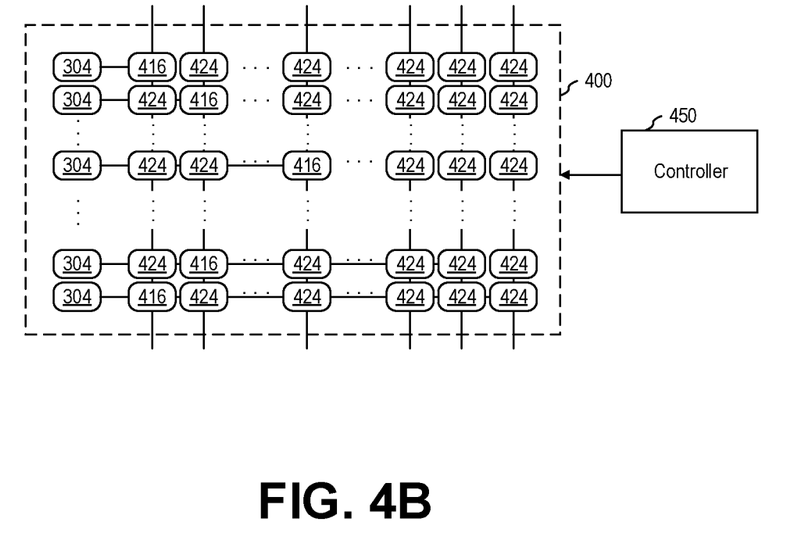
Figure 4C:
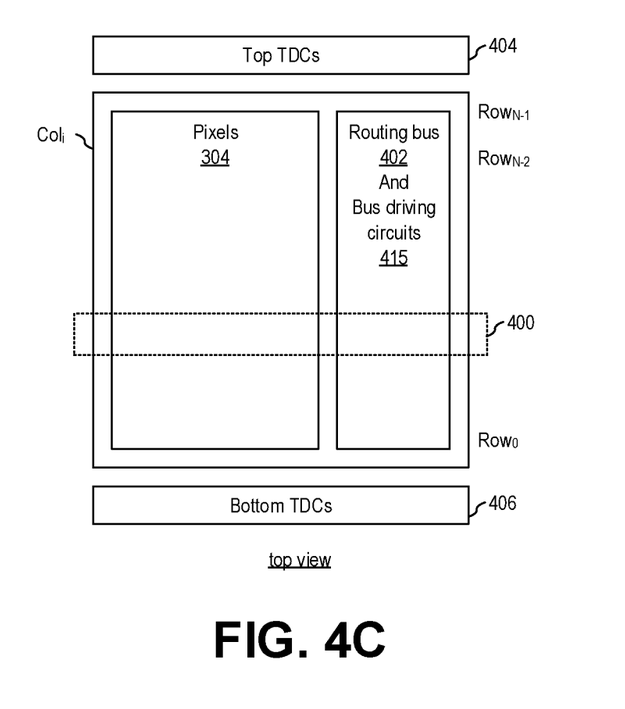

FIGS. 4A-4C show different levels of detail of column $Col_i$ of subset of pixels 400, according to an embodiment of the present invention. Each subset of pixels of pixel array 302 (such as active subset of pixels 306) may be implemented as subset of pixels 400. It is understood that column $Col_i$ could be any column of the M columns of pixel array 302.

As shown in FIG. 4A, column $Col_i$ of subset of pixels 400 includes a plurality of pixels 304 coupled to respective bus driving circuits 415. Each pixel includes SPAD front-end circuit 410, SPAD 412, and buffer 414. Each bus driving circuit 415 includes a plurality of bus drivers (416 or 424) coupled to routing bus 402. As shown in FIG. 4A, routing bus 402 is coupled to a top plurality of TDCs 404 and to a bottom plurality of TDCs 406. Each bus driver (416 or 424) may route a signal received up to the respective TDC of the top plurality of TDCs 404 or down to the respective TDC of the bottom plurality of TDCs 406.

Even though FIG. 4A shows each pixel 304 including a single SPAD 412 coupled to buffer 414, it us understood that some embodiments may replace single SPAD 412 and buffer 414 with a plurality of SPADs (such as SPADs 202) coupled to an OR tree.

As shown in FIGS. 4A and 4B, each SPAD 412 is coupled to at least one bus driver circuit 416.

Bus driver 416 is configured to propagate the signal at the output of buffer 414 up (via buffer 420) or down (via buffer 422) routing bus 402, e.g., when select signal Sel is equal to 1. When select signal Sel is equal to, e.g., 0, signal $S_{420}$ is buffered by multiplexer (MUX) 418 into the input of buffer 422, which propagates it down via buffer 422. When select signal Sel is equal to, e.g., 2, signal $S_{422}$ is buffered by MUX 418 into the input of buffer 420, which propagates it up via buffer 420. In other words, when select signal Sel is equal to, e.g., 1, bus driver 416 propagates the signal from the corresponding SPAD 412 (up or down), e.g., depending on the location of the SPAD with respect to the subset of pixels 400. And when select signal Sel is equal to, e.g., 0 or 1, bus driver 416 behaves as a buffer that buffers up (e.g., when Sel=2) or down (e.g., when Sel=0) the signals coming from routing bus 402.

Buffers 420 and 422 may be implemented in any way known in the art. For example, in some embodiments, buffers 420 and 422 may be implemented with one or more inverters.

Bus driver 424 is configured to propagate signals from routing bus 402 either up or down. As shown, bus drivers 424 are capable of dynamically reconfiguring the direction of buffering. In some embodiments, bus driver 424 may be implemented as bus driver 416.

Controller 450 is configured to generate select signals Sel for each of bus drivers 416 and 424 of subset of pixels 400 to configure them as up-buffers (e.g., Sel=2), down-buffers (e.g., Sel=0), or for buffering event signals of their respective SPADs (e.g., Sel=0).

Some embodiments include one controller 450 per subset of pixels 400. Other embodiments include a single controller 450 for all subset of pixels of pixel array 302. Other implementations are also possible.

Controller 450 may be implemented, for example, using combinatorial logic (such as a finite state machine, for example), e.g., coupled to a memory (such as registers, OTP, ROM, or RAM, for example).

In some embodiments, routing bus 402 includes L/2 routing lines when column $Col_i$ of subset of pixels 400 includes L pixels 304. For example, when column $Col_i$ of subset of pixels 400 has 30 pixels 304, routing bus 402 has 15 routing lines (which are respectively coupled to 15 TDCs 404 and 15 TDCs 406). In some embodiments, L may be higher than 30, such as 40, or higher, or lower than 30, such as 20 or lower.

As shown in FIG. 4B, each routing line of routing bus 402 is shared by two pixels 304 of column $Col_i$ of subset of pixels 400 to propagate signals associated with their respective SPADs (as illustrated by the presence bus driver 416).

FIG. 4C shows a top view of pixel array 302 column $Col_i$ of pixel array 302 showing the physical placement of pixels 304, routing bus 402 and corresponding bus driver circuits 415, and top and bottom TDCs 404 and 406, respectively, according to an embodiment of the present invention.

During normal operation, when subset of pixels 400 is active, controller 450 configures bus drivers 416 and 424 so that each pixel 304 propagates event signals associated with their respective SPADs 412 using bus driver 416. The top half of pixels 304 propagate their respective event signals up to top TDCs 404 via the bus drivers 424 coupled between the respective bus driver 416 and top TDCs 404. The bottom half of pixels propagate their respective event signals down to bottom TDCs 406 via the bus drivers 424 between the respective bus driver 416 and bottom TDCs 406.

During normal operation, subset of pixels that are below the active subset of pixels operate their bus drivers 416 and 424 as buffers that buffer down signals of routing bus 402 to bottom TDCs 406. In a similar manner, subset of pixels that are above the active subset of pixels operate their bus drivers 416 and 424 as buffers that buffer up signals of routing bus 402 to top TDCs 404.

In some embodiments, using bus drivers 424 advantageously allows for preserving timing precision of the event signals generated by SPADs 412. In some embodiments, additional buffers and/or inverters may be used to balance the event signals from SPADs 412.

In some embodiments, the placement of bus drivers 416 with respect to the location of pixel 304 in subset of pixels 400 may be selected to balance timing. For example, in some embodiments, the pixel 304 closest to the top of subset of pixel 400 (and the one closest to the bottom) has its corresponding bus driver 416 farthest to the right, while the pair of pixel 304 closest to the center of subset of pixels 400 have their corresponding bus driver 416 closest to the left, e.g., to compensate for the longer routing of the pixels closest to the center of subset of pixels 400 when compared to those at the edge of subset of pixels 400.

SPAD front-end circuit 410 is configured to bias SPAD 412. In some embodiments, SPAD front-end circuit has an enable input configured to receive a spad_enable signal (not shown). In such embodiments, SPAD front-end circuit may enable SPAD 412 when the spad_enable signal is asserted. In some embodiments, activating a SPAD includes asserting the spad_enable signal. In some embodiments, activating a subset of SPAD includes asserting the spad_enable signal of each SPAD in the subset of SPADs. SPAD front-end circuit 410 may be implemented in any way known in the art.

As shown in FIGS. 4A-4C, some embodiments include top TDCs 404 at the top of column $Col_i$, and bottom TDCs 406 at the bottom of column $Col_i$. Some embodiments may have additional rows of TDCs embedded in pixel array 302. For example, FIG. 5 shows a column $Col_i$ of pixel array 302, according to an embodiment of the present invention.

Figure 5:
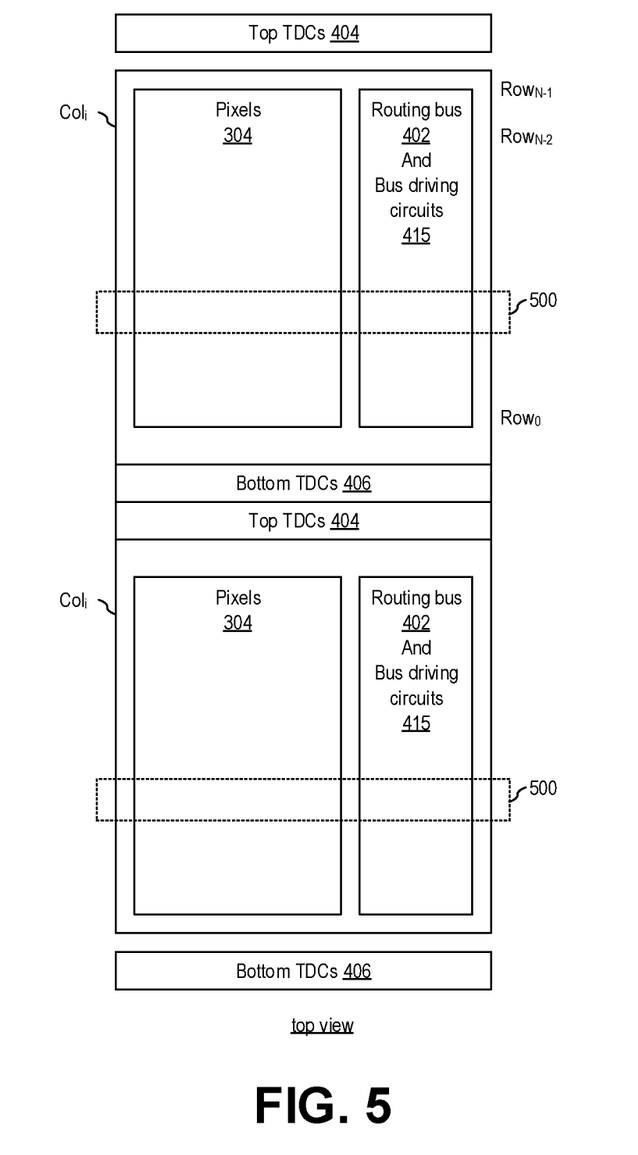
FIG. 5 shows a column of pixels of the pixel array of FIG. 3, according to an embodiment of the present invention.

The embodiment of FIG. 5 operates in a similar manner as the embodiment illustrated in FIGS. 4A-4C. The embodiment of FIG. 5, however, includes two split routing buses 402 in a column $Col_i$ of pixels 304. In such embodiments, two active subset of pixels 500 may perform the integration process simultaneously. Some embodiments may include more than two split routing buses 402.

In an embodiment of the present invention, routing inside a DTOF sensor is reduced by sharing a bus for routing SPAD events (e.g., SPAD pulses) from each subset of SPADs to corresponding, in-array, TDCs and histogram generation circuits, and for data readout.

Figure 6A:
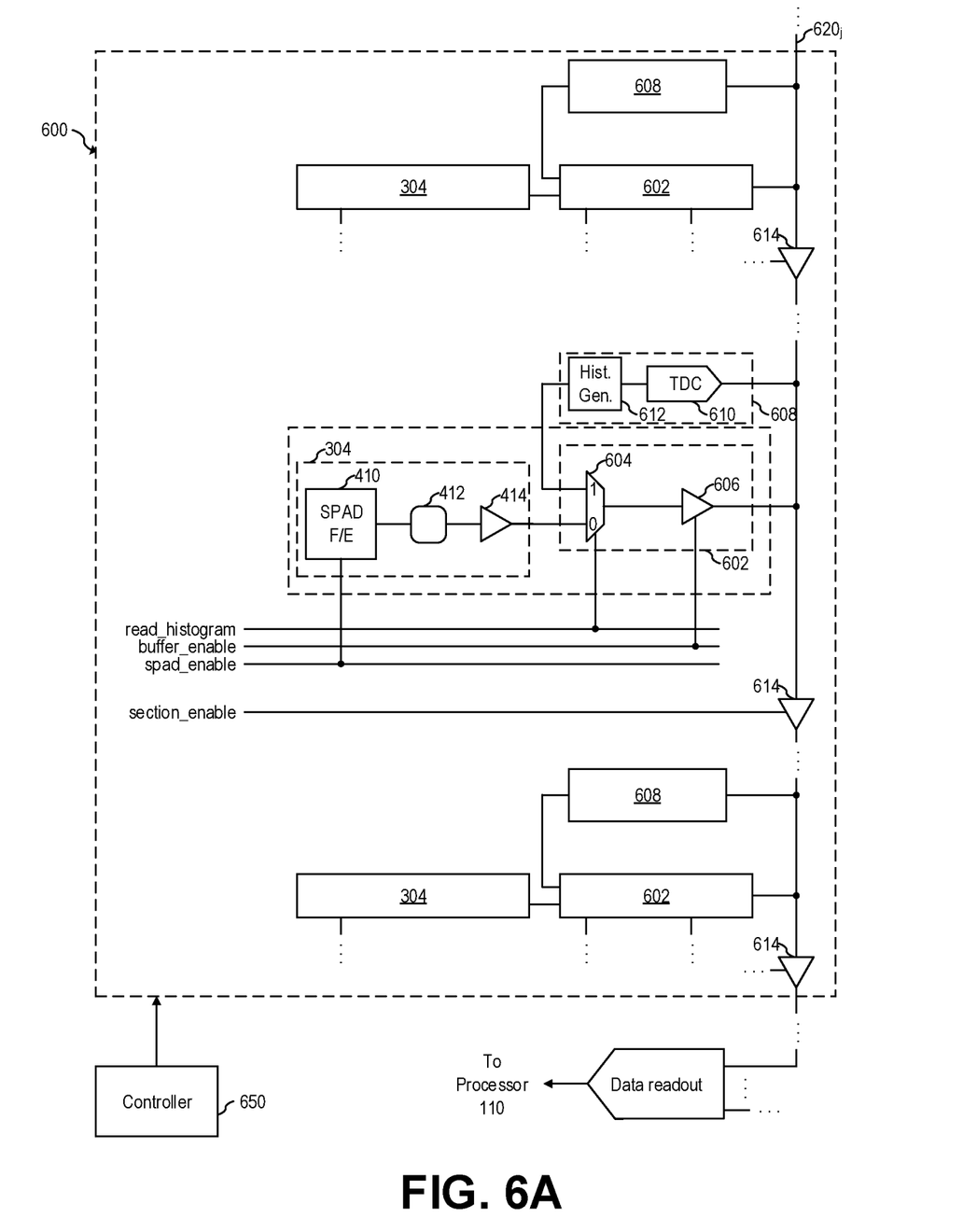
FIGS. 6A-6C show different levels of detail of a possible implementation of a subset of pixels of the pixel array of FIG. 3, according to an embodiment of the present invention.
Figure 6B:
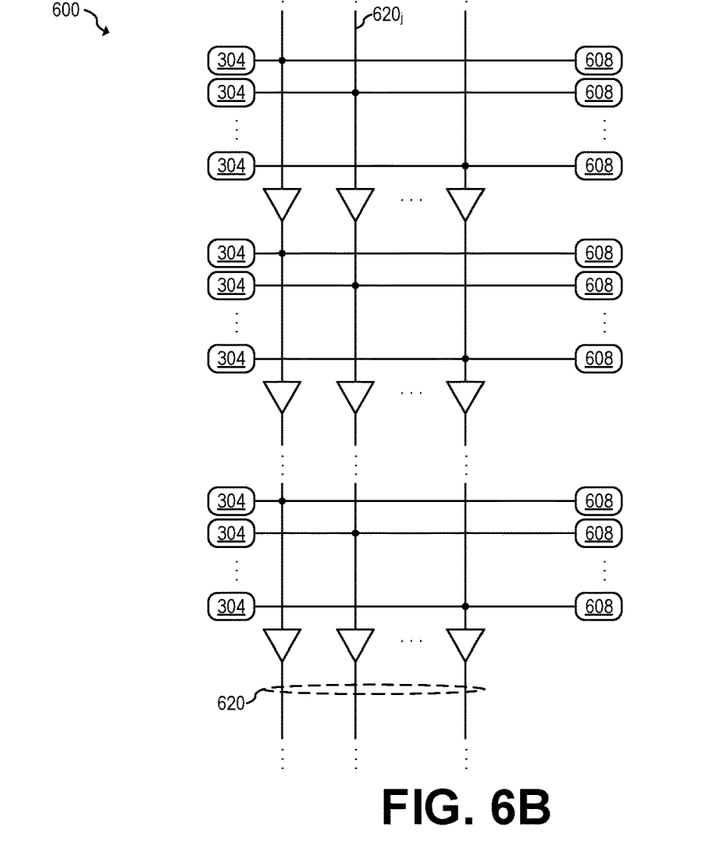
Figure 6C:
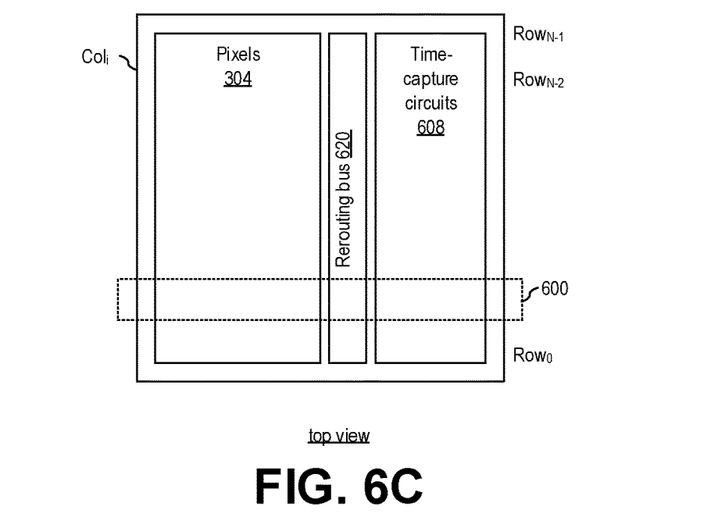

FIGS. 6A-6C show different levels of detail of column $Col_i$ of subset of pixels 600, according to an embodiment of the present invention. Each subset of pixels of pixel array 302 (such as active subset of pixels 306) may be implemented as subset of pixels 600. It is understood that column $Col_i$ could be any column of the M columns of pixel array 302.

As shown in FIG. 6A, column $Col_i$ of subset of pixels 600 includes a plurality of pixels 304 coupled to routing bus 620 via respective bus driving circuits 602. As shown in FIG. 6B, Routing bus 620 has J routing lines, where J is a positive integer greater than or equal to 1. Routing line 620j could be any of the J routing lines of routing bus 620.

Each pixel 304 includes SPAD front-end circuit 410, SPAD 412, and buffer 414. Each bus driving circuit 602 includes MUX 604 and tri-state buffer 606 coupled to a routing line 620j of routing bus 620. As shown in FIG. 6A, routing line 620j is coupled to a plurality of time-capture circuits 608, where each time-capture circuit 608 includes TDC 610 and histogram generation circuit 612.

The plurality of time-capture circuits 608 are shared across all subset of pixels of column $Col_j$, and each column of pixels has its corresponding plurality of time-capture circuits 608.

During the integration process of subset of pixels 600 (when subset of pixels 600 is active and in integration mode) read_histogram signal is deasserted (e.g., logic low), buffer_enable signal is asserted (e.g., logic high) and spad_enable signal is asserted (e.g., logic_high), and section_enable signal is deasserted (e.g., logic low). During this state, routing line 620j is configured to propagate event signals generated by SPAD 412 via buffer 414, MUX 604, and tri-state buffer 606 into routing line 620j. TDC 610 receives the generated event signals from routing line 620j and histogram generation circuit 612 generates ToF histograms based on the output of TDC 610. Since tri-state buffers 614 are disabled, each pixel 304 that is coupled to routing line 620j is isolated from each other so that each pixel 304 may perform the integration operation in cooperation with the corresponding time-capture circuit 608.

During the readout process (when subset of pixels 600 is in readout mode), read_histogram signal is asserted (e.g., logic high), spad_enable signal is deasserted (e.g., logic_low), and section_enable signal is asserted (e.g., logic high). During this state, buffer_enable signal is sequentially asserted (e.g., logic high) so that data from each histogram generation circuit 612 (e.g., ToF histogram data, such as counts per bin) are sequentially propagated via an array bus (e.g., where the array bus includes the (e.g., vertical) routing lines connecting tri-state buffers 614, 606, and TDC 610) to MUX 604, and then to tri-state buffer 606 into routing line 620j. Processor 110 then sequentially receives the data from each histogram generation circuit 612 and, e.g., may perform further processing.

In some embodiments, the J (e.g., vertical) routing lines of routing bus 620 repeat in a (e.g., vertical) pattern. For example, if subset of pixels 600 has 30 pixels 304 per column, and J is 10, then there are 3 pixels coupled to each routing line of routing bus 620 per subset of pixels 600. The pattern repeats for each subset of pixels of column $Col_i$.

In such example, there are 30 TDCs 610 (and corresponding histogram generation circuits) associated to column $Col_i$ and coupled to the routing bus 620 (3 TDCs coupled to each of the 10 routing lines of routing bus 620).

As shown in FIG. 6C, each column $Col_i$ includes a column of pixels 304 and a column of time-capture circuits 608. In some embodiments, pixels array 302 includes M columns of pixels 304 alternating with M columns of time-capture circuits 608, wherein M is a positive integer greater than 1. Other arrangements are also possible. For example, in some embodiments, pixel array 302 includes M/2 pairs of columns of pixels 304 alternating with M/2 pairs of columns of time-capture circuits 608 (e.g., in a mirror image arrangement).

Controller 650 is configured to generate read_histogram, buffer_enable, spad_enable, and section_enable signals to configure subset of pixels 600, e.g., for integration or for readout.

Some embodiments include one controller 650 per subset of pixels 600. Other embodiments include a single controller 650 for all subset of pixels of pixel array 302. Other implementations are also possible.

Controller 650 may be implemented, for example, using combinatorial logic (such as a finite state machine, for example), e.g., coupled to a memory (such as registers, OTP, ROM, or RAM, for example).

Advantages of some embodiments include allowing the reduction of routing by sharing the routing bus to route SPAD pulses during the integration process and to route histogram data during data readout. In some embodiments, the reduction in routing may allow for the implementation of higher resolution DTOF sensors since, e.g., the complexities of routing congestion associated with coupling routing lines to histogram generation circuits that may be substantially larger than a pixel (e.g., may be spread over the height of multiple pixels) may be mitigated or avoided. Some embodiments may advantageously achieve a very compact implementation since there is no additional area for histogram generation circuits outside the array.

Figure 7:
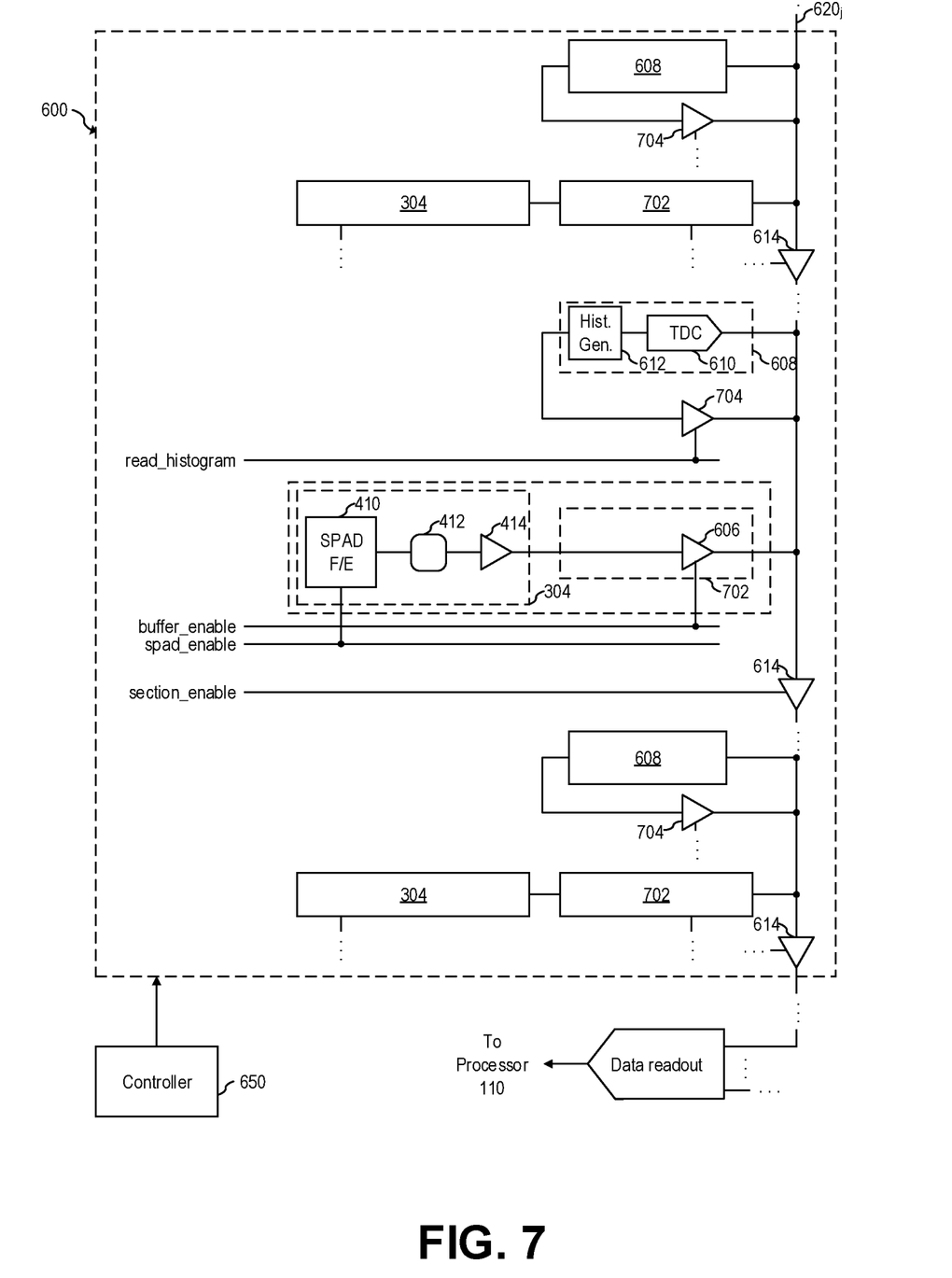
FIG. 7 shows a column of pixels of the pixel array of FIG. 3, according to an embodiment of the present invention.

FIG. 7 shows a column $Col_j$ of pixel array 302, according to an embodiment of the present invention. The embodiment of FIG. 7 operates in a similar manner as the embodiment illustrated in FIGS. 6A-6C. The embodiment of FIG. 7, however, includes buffer 704 for buffering histogram data directly into routing line 620$j$ instead of going through bus driving circuit 602.

Example embodiments of the present invention are summarized here. Other embodiments can also be understood from the entirety of the specification and the claims filed herein.

Example 1. A time-of-flight (ToF) sensor including: an array of pixels arranged in rows and columns, the array of pixels including first and second subsets of pixels, each pixel of the array of pixels configured to generate event signals; a first plurality of time to digital converters (TDCs); a second plurality of TDCs; a first routing bus coupled to the first and second pluralities of TDCs and to the first and second subsets of pixels, the first routing bus including a first plurality of bus drivers associated with the first subset of pixels and a second plurality of bus drivers associated with the second subset of pixels, the first plurality of bus drivers coupled to the second plurality of TDCs via the second plurality of bus drivers, and the second plurality of bus drivers coupled to the first plurality of TDCs via the first plurality of bus drivers; and a controller configured to: when the first subset of pixels is active and the second subset of pixels is not active, control the first plurality of bus drivers to route event signals from half of the pixels of the first subset of pixels to the first plurality of TDCs and control the first and second plurality of bus drivers to route event signals from the other half of the pixels of the first subset of pixels to the second plurality of TDCs, and when the first subset of pixels is not active and the second subset of pixels is active, control the first plurality of bus drivers to route event signals from the second subset of pixels to the first plurality of TDCs.

Example 2. The ToF sensor of example 1, where: the first subset of pixels includes L pixels, L being a positive integer greater than 1; the second subset of pixels includes L pixels; and the first routing bus includes L/2 routing lines.

Example 3. The ToF sensor of one of examples 1 or 2, where L is 30.

Example 4. The ToF sensor of one of examples 1 to 3, where each routing line of the first routing bus is configured to receive event signals from two pixels of the first subset of pixels.

Example 5. The ToF sensor of one of examples 1 to 4, where the first and second subsets of pixels are physically disposed between the first and second pluralities of TDCs.

Example 6. The ToF sensor of one of examples 1 to 5, where each pixel of the first subset of pixels includes a single photon avalanche diode (SPAD) coupled to a respective bus driver of the first plurality of bus drivers.

Example 7. The ToF sensor of one of examples 1 to 6, where each bus driver of the first plurality of bus drivers includes: a multiplexer; a first buffer having an input coupled to an output of the multiplexer and an output coupled to a first input of the multiplexer; and a second buffer having an input coupled to the output of the multiplexer and an output coupled to a second input of the multiplexer.

Example 8. The ToF sensor of one of examples 1 to 7, where the first and second subset of pixels correspond to a first column of pixels of the array of pixels, the ToF sensor further including: a second routing bus associated with a second column of pixels of the array of pixels, where the second column of pixels includes a third subset of pixels; and third and fourth pluralities of TDCs, where, when the third subset of pixels is active, the second routing bus is configured to route event signals from half of the pixels of the third subset of pixels to the third plurality of TDCs and to route event signals from the other half of the pixels of the third subset of pixels to the fourth plurality of TDCs.

Example 9. The ToF sensor of one of examples 1 to 8, where the first and third subset of pixels are configured to be active at the same time.

Example 10. The ToF sensor of one of examples 1 to 9, further including an illumination source configured to generate light pulses, where pixels of the array of pixels are configured to generate event signals from light pulses that are based on the generated light pulses.

Example 11. The ToF sensor of one of examples 1 to 10, further including a processor configured to generate ToF histograms based on outputs of the first and second pluralities of TDCs.

Example 12. A method including: activating a first subset of pixels of an array of pixels of a time-of-flight (ToF) sensor, the array of pixels being arranged in rows and columns; when the first subset of pixels is active, controlling a first plurality of bus drivers of a first routing bus to route event signals from half of the pixels of the first subset of pixels to a first plurality of TDCs and controlling the first plurality of bus drivers and a second plurality of bus drivers to route event signals from the other half of the pixels of the first subset of pixels to a second plurality of TDCs, where the first plurality of bus drivers is coupled to the second plurality of TDCs via the second plurality of bus drivers, where the second plurality of bus drivers is coupled to the first plurality of TDCs via the first plurality of bus drivers, where the first plurality of bus drivers is associated with the first subset of pixels, and where the second plurality of bus drivers associated with a second subset of pixels of the array of pixels; activating the second subset of pixels; and when the second subset of pixels is active, controlling the first plurality of bus drivers to route event signals from the second subset of pixels to the first plurality of TDCs.

Example 13. The method of example 12, further including receiving event signals with a routing line of the first routing bus from two pixels of the first subset of pixels.

Example 14. The method of one of examples 12 or 13, further including: generating a plurality of light pulses; and receiving reflected light pulses with the array of pixels, where the event signals from the pixels of the first subset of pixels are based on the reflected light pulses.

Example 15. The method of one of examples 12 to 14, further including generating ToF histograms based on outputs from the first and second pluralities of TDCs.

Example 16. The method of one of examples 12 to 15, where: the first subset of pixels includes L pixels, L being a positive integer greater than 1; the second subset of pixels includes L pixels; and the first routing bus includes L/2 routing lines.

Example 17. An integrated circuit (IC) including: an array of pixels arranged in rows and columns, the array of pixels including a first subset of pixels, each pixel of the array of pixels configured to generate event signals; a top plurality of time to digital converters (TDCs) physically disposed at the top of the array of pixels; a bottom plurality of TDCs physically disposed at the bottom of the array of pixels; a routing bus coupled to the top and bottom pluralities of TDCs and to the first subset of pixels, the routing bus including a plurality of bus drivers associated with the first subset of pixels; and a controller configured to: when the first subset of pixels is active, control the plurality of bus drivers to route event signals from a top half of the pixels of the first subset of pixels to the top plurality of TDCs and to route event signals from a bottom half of the pixels of the first subset of pixels to the bottom plurality of TDCs, and when the first subset of pixels is not active, control all of the plurality of bus drivers to route event signals of the routing bus to the top plurality of TDCs.

Example 18. The IC of example 17, where each routing line of the routing bus is configured to receive event signals from two pixels of the first subset of pixels.

Example 19. The IC of one of examples 17 or 18, where: the first subset of pixels includes L pixels, L being a positive integer greater than 1; and the routing bus includes L/2 routing lines.

Example 20. The IC of one of examples 17 to 19, where each bus driver of the plurality of bus drivers includes: a multiplexer; a first buffer having an input coupled to an output of the multiplexer and an output coupled to a first input of the multiplexer, the output of the first buffer further coupled to a top TDC of the top plurality of TDCs; and a second buffer having an input coupled to the output of the multiplexer and an output coupled to a second input of the multiplexer, the output of the second buffer further coupled to a bottom TDC of the plurality of bottom TDCs.

Example 21. A time-of-flight (ToF) sensor including: an array of pixels arranged in rows and columns, each pixel of the array of pixels configured to generate event signals, the array of pixels including a subset of pixels; a routing bus coupled to the subset of pixels; a plurality of time-capture circuits coupled to the routing bus; and a controller configured to: when the subset of pixels is in integration mode, route event signals from a first pixel of the subset of pixels to a first time-capture circuit of the plurality of time-capture circuits via a first routing line of the routing bus, and when the subset of pixels is in readout mode, route data from the first time-capture circuit to a reading circuit via the first routing line.

Example 22. The ToF sensor of example 21, where the first routing line includes a section tri-state buffer coupled between the first pixel and a second pixel of the subset of pixels, and where the controller is further configured to: when the subset of pixels is in integration mode, disable the section tri-state buffer; and when the subset of pixels is in readout mode, enable the section tri-state buffer.

Example 23. The ToF Sensor of one of examples 21 or 22, where the controller is further configured to, when the subset of pixels is in integration mode, route event signals from the second pixel to a second time-capture circuit of the plurality of time-capture circuits via the first routing line.

Example 24. The ToF sensor of one of examples 21 to 23, where the first time-capture circuit includes a time-to-digital converter (TDC).

Example 25. The ToF sensor of one of examples 21 to 24, where the first time-capture circuit further includes a histogram generation circuit, and where routing data from the first time-capture circuit to the reading circuit includes routing ToF histograms.

Example 26. The ToF sensor of one of examples 21 to 25, where each time-capture circuit of the plurality of time-capture circuits includes a respective tri-state buffer coupled to the routing bus.

Example 27. The ToF sensor of one of examples 21 to 26, where each pixel of the subset of pixels includes a single photon avalanche diode (SPAD) coupled to the routing bus via a respective bus driving circuit.

Example 28. The ToF sensor of one of examples 21 to 27, where each bus driving circuit includes a tri-state buffer coupled to the routing bus.

Example 29. The ToF sensor of one of examples 21 to 28, where each bus driving circuit further includes a multiplexer having a first input coupled to the respective SPAD, a second input coupled to a corresponding time-capture circuit of the plurality of time-capture circuits, and an output coupled to the respective tri-state buffer.

Example 30. The ToF sensor of one of examples 21 to 29, where the subset of pixels correspond to a first column of pixels of the array of pixels, the ToF sensor further including: a second routing bus associated with a second column of pixels of the array of pixels, where the second column of pixels includes a second subset of pixels; and a second plurality of time-capture circuits coupled to the second routing bus, where, when the second subset of pixels is in integration mode, a second routing line of the second routing bus is configured to route event signals from a second pixel of the second subset of pixels to a second time-capture circuit of the second plurality of time-capture circuits, and when the second subset of pixels is in readout mode, the second routing line is configured to route data from the second time-capture circuit to the reading circuit.

Example 31. The ToF sensor of one of examples 21 to 30, where the subset of pixels and the second subset of pixels are configured to be in integration mode at the same time.

Example 32. The ToF sensor of one of examples 21 to 31, where the reading circuit includes an external processor.

Example 33. The ToF sensor of one of examples 21 to 32, further including an illumination source configured to generate light pulses, where pixels of the array of pixels are configured to generate event signals from light pulses that are based on the generated light pulses.

Example 34. A method including: setting a subset of pixels of an array of pixels of a time-of-flight (ToF) sensor to integration mode, the array of pixels being arranged in rows and columns; when the subset of pixels is in integration mode, routing event signals from a first pixel of the subset of pixels to a first time-capture circuit of a plurality of time-capture circuits via a first routing line of a routing bus; setting the subset of pixels to readout mode; and when the subset of pixels is in readout mode, routing data from the first time-capture circuit to a reading circuit via the first routing line.

Example 35. The method of example 34, further including: when the subset of pixels is in integration mode, disabling a section tri-state buffer that is coupled between the first pixel and a second pixel of the subset of pixels; and when the subset of pixels is in readout mode, enabling the section tri-state buffer.

Example 36. The method of one of examples 34 or 35, further including, when the subset of pixels is in integration mode, routing event signals from the second pixel to a second time-capture circuit of the plurality of time-capture circuits via the first routing line.

Example 37. The method of one of examples 34 to 36, further including: generating a plurality of light pulses; and receiving reflected light pulses with the array of pixels, where the event signals are based on the reflected light pulses.

Example 38. An integrated circuit (IC) including: an array of pixels arranged in rows and columns, each pixel of the array of pixels configured to generate event signals, the array of pixels including a subset of pixels; a routing bus coupled to the subset of pixels, the routing bus including J routing lines, where J is a positive integer greater than 1, where each routing line of the J routing lines is coupled to more than 1 pixels of the subset of pixels; a plurality of time-capture circuits coupled to the routing bus; and a controller configured to: when the subset of pixels is in integration mode, route event signals from a first pixel of the subset of pixels to a first time-capture circuit of the plurality of time-capture circuits via a first routing line of the routing bus, and when the subset of pixels is in readout mode, route data from the first time-capture circuit to a reading circuit via the first routing line.

Example 39. The IC of example 38, where each routing line of the J routing lines is coupled to 3 pixels of the subset of pixels.

Example 40. The IC of one of examples 38 or 39, where the array of pixels includes M columns of pixels and M columns of TDCs in an alternate pattern, where M is a positive integer greater than 1.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An integrated circuit (IC) comprising:
an array of pixels arranged in rows and columns, the array of pixels comprising a first subset of pixels, each pixel of the array of pixels configured to generate event signals;
a top plurality of time to digital converters (TDCs) physically disposed at a top of the array of pixels;
a bottom plurality of TDCs physically disposed at a bottom of the array of pixels;
a routing bus coupled to the top and bottom pluralities of TDCs and to the first subset of pixels, the routing bus comprising a plurality of bus drivers associated with the first subset of pixels; and
a controller configured to:
when the first subset of pixels is active, control the plurality of bus drivers to route event signals from a top half of the pixels of the first subset of pixels to the top plurality of TDCs and to route event signals from a bottom half of the pixels of the first subset of pixels to the bottom plurality of TDCs, and
when the first subset of pixels is not active, control all of the plurality of bus drivers to route event signals of the routing bus to the top plurality of TDCs.

2. The IC of claim 1, wherein each routing line of the routing bus is configured to receive event signals from two pixels of the first subset of pixels.

3. The IC of claim 1, wherein:
the first subset of pixels comprises L pixels, L being a positive integer greater than 1; and
the routing bus comprises L/2 routing lines.

4. The IC of claim 1, wherein each bus driver of the plurality of bus drivers comprises:
a multiplexer;
a first buffer having an input coupled to an output of the multiplexer and an output coupled to a first input of the multiplexer, the output of the first buffer further coupled to a top TDC of the top plurality of TDCs; and
a second buffer having an input coupled to the output of the multiplexer and an output coupled to a second input of the multiplexer, the output of the second buffer further coupled to a bottom TDC of the plurality of bottom TDCs.

5. A time-of-flight (ToF) sensor comprising:
an array of pixels arranged in rows and columns, each pixel of the array of pixels configured to generate event signals, the array of pixels comprising a subset of pixels;
a routing bus coupled to the subset of pixels;
a plurality of time-capture circuits coupled to the routing bus; and
a controller configured to:
when the subset of pixels is in integration mode, route event signals from a first pixel of the subset of pixels to a first time-capture circuit of the plurality of time-capture circuits via a first routing line of the routing bus, and
when the subset of pixels is in readout mode, route data from the first time-capture circuit to a reading circuit via the first routing line.

6. The ToF sensor of claim 5, wherein the first routing line comprises a section tri-state buffer coupled between the first pixel and a second pixel of the subset of pixels, and wherein the controller is further configured to:
when the subset of pixels is in integration mode, disable the section tri-state buffer; and
when the subset of pixels is in readout mode, enable the section tri-state buffer.

7. The ToF Sensor of claim 6, wherein the controller is further configured to, when the subset of pixels is in integration mode, route event signals from the second pixel to a second time-capture circuit of the plurality of time-capture circuits via the first routing line.

8. The ToF sensor of claim 5, wherein the first time-capture circuit comprises a time-to-digital converter (TDC).

9. The ToF sensor of claim 8, wherein the first time-capture circuit further comprises a histogram generation circuit, and wherein routing data from the first time-capture circuit to the reading circuit comprises routing ToF histograms.

10. The ToF sensor of claim 5, wherein each time-capture circuit of the plurality of time-capture circuits comprises a respective tri-state buffer coupled to the routing bus.

11. The ToF sensor of claim 5, wherein each pixel of the subset of pixels comprises a single photon avalanche diode (SPAD) coupled to the routing bus via a respective bus driving circuit.

12. The ToF sensor of claim 11, wherein each bus driving circuit comprises a tri-state buffer coupled to the routing bus.

13. The ToF sensor of claim 12, wherein each bus driving circuit further comprises a multiplexer having a first input coupled to the respective SPAD, a second input coupled to a corresponding time-capture circuit of the plurality of time-capture circuits, and an output coupled to the respective tri-state buffer.

14. The ToF sensor of claim 5, wherein the subset of pixels correspond to a first column of pixels of the array of pixels, the ToF sensor further comprising:
a second routing bus associated with a second column of pixels of the array of pixels, wherein the second column of pixels comprises a second subset of pixels; and
a second plurality of time-capture circuits coupled to the second routing bus, wherein, when the second subset of pixels is in integration mode, a second routing line of the second routing bus is configured to route event signals from a second pixel of the second subset of pixels to a second time-capture circuit of the second plurality of time-capture circuits, and when the second subset of pixels is in readout mode, the second routing line is configured to route data from the second time-capture circuit to the reading circuit.

15. The ToF sensor of claim 14, wherein the subset of pixels and the second subset of pixels are configured to be in integration mode at the same time.

16. The ToF sensor of claim 5, wherein the reading circuit comprises an external processor.

17. The ToF sensor of claim 5, further comprising an illumination source configured to generate light pulses, wherein pixels of the array of pixels are configured to generate event signals from light pulses that are based on the generated light pulses.

18. A method comprising:
setting a subset of pixels of an array of pixels of a time-of-flight (ToF) sensor to integration mode, the array of pixels being arranged in rows and columns;
when the subset of pixels is in integration mode, routing event signals from a first pixel of the subset of pixels to a first time-capture circuit of a plurality of time-capture circuits via a first routing line of a routing bus;
setting the subset of pixels to readout mode; and
when the subset of pixels is in readout mode, routing data from the first time-capture circuit to a reading circuit via the first routing line.

19. The method of claim 18, further comprising:
when the subset of pixels is in integration mode, disabling a section tri-state buffer that is coupled between the first pixel and a second pixel of the subset of pixels; and
when the subset of pixels is in readout mode, enabling the section tri-state buffer.

20. The method of claim 19, further comprising, when the subset of pixels is in integration mode, routing event signals from the second pixel to a second time-capture circuit of the plurality of time-capture circuits via the first routing line.

21. The method of claim 18, further comprising:
generating a plurality of light pulses; and
receiving reflected light pulses with the array of pixels, wherein the event signals are based on the reflected light pulses.

22. The method of claim 18, wherein the first time-capture circuit comprises a time-to-digital converter (TDC), wherein the first time-capture circuit further comprises a histogram generation circuit, and wherein routing data from the first time-capture circuit to the reading circuit comprises routing ToF histograms.

* * * * *